UNITED STATES PATENT OFFICE.

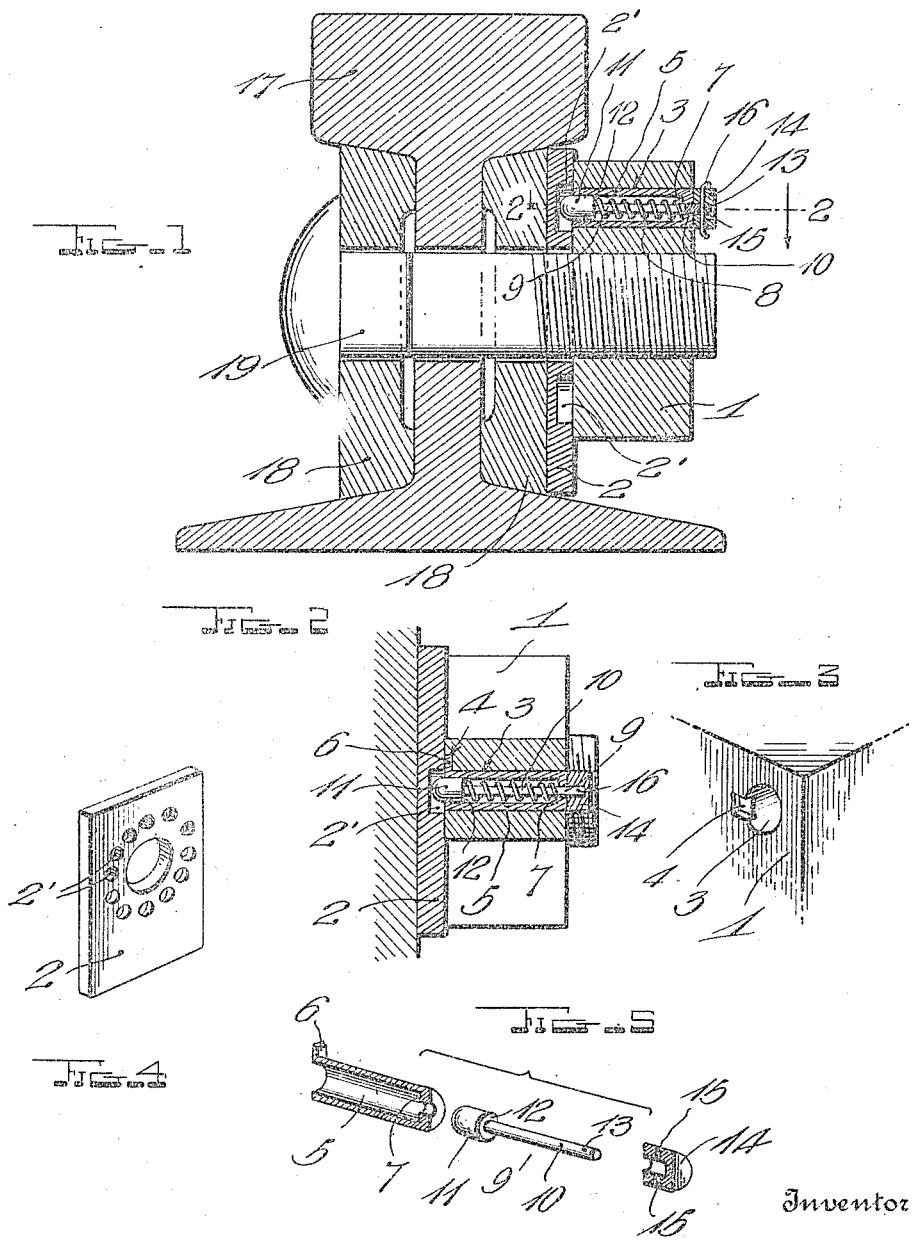

JAMES A. HALL, OF LIBERTY MILLS, INDIANA, ASSIGNOR OF ONE-HALF TO WALKER K. BURWELL, OF CHURUBUSCO, INDIANA.

NUT-LOCK.

1,238,012.   Specification of Letters Patent.   Patented Aug. 21, 1917.

Application filed April 9, 1917. Serial No. 160,816.

*To all whom it may concern:*

Be it known that I, JAMES A. HALL, a citizen of the United States, residing at Liberty Mills, in the county of Wabash and State of Indiana, have invented certain new and useful Improvements in Nut-Locks; and I do declare the following to be a full, clear, and exact description of the invention, such as will enable others skilled in the art to which it appertains to make and use the same.

This invention relates to improvements in nut locks and more particularly to that type which contain in themselves a device for securely locking the nut when screwed up, and which can be readily unlocked.

One object of this invention is to provide a simple and durable nut lock which will be inexpensive to manufacture, easy to operate, and strong and durable in operation.

Another object of the invention is to provide a nut lock which contains in itself a device for securely locking the nut and which is of non-rusting material, so that the parts will not rust together and cause the head of the bolt to be sawed off.

With these and numerous other objects in view, the invention consists of the novel features of construction, and the combination and arrangement of parts as will be hereinafter fully described and claimed.

In the accompanying drawing:

Figure 1 is a vertical section through a rail joint showing the appliance of my improved nut lock;

Fig. 2 is a detail horizontal section on the line 2—2 of Fig. 1;

Fig. 3 is a fragmentary perspective view of a portion of the nut;

Fig. 4 is a perspective view of the washer; and,

Fig. 5 is a sectional perspective view of the parts constituting the nut lock.

The device comprises a nut 1, of standard dimensions which may be constructed to fit standard bolts of any size and a washer 2 which has a plurality of sockets or recesses 2′ placed circumferentially therein about the center opening to coöperate with the nut, and with a fish plate of a rail joint or with any other suitable base.

The nut 1 is provided with a cylindrical recess 3 extending longitudinally of the nut. A notched out seat 4 is provided on the inner face of the nut 1 and communicates with the recess 3. A cylindrical tube or casing 5 of copper or some non-rusting material is provided with an outwardly projecting shoulder 6 and is adapted to slide into the recess 3, the shoulder 6 engaging the notched out seat 4. The end of the tube 5 opposite the shoulder 6 is partially closed so as to form a seat 7 within the said tube 5. The opposite ends of the casing are flush with the faces of the nut 1. A coil spring 8 is slidably mounted in the tube 5 and has one of its ends engaging the seat 7. A pin 9 of some non-rusting material is provided and has its greater length reduced as at 10. The head 11 of the pin 9 is constructed so as to provide a shoulder 12 on its inner face and is rounded on its outer face, the pin 9 being inserted through the tube 5, so that the spring 8 engages the shoulder 12. A transverse opening 13 is cut through the reduced portion 10 at the end of the pin 9.

A cap member 14 of non-rusting material is provided and fits over the end of the reduced portion of the pin 9. Holes 15 are bored transversely through cap member 14 for the reception of the rod or bar 16. When the holes 15 are in alinement with the hole 13, the bar 16 is pushed into place and bent at its ends to hold the parts together.

It will be noted that when the parts are in operative position, the head 11 of the pin 9 will fill the opening in the inner face of the nut, and the cap member 14 will cover the opening in the outside face of said nut.

In operation, the rails 17 are placed in alinement and the fish plates 18 fixed in place and the bolts 19 slid through the openings in said rails and fish plates. The washer 2 is then placed over the threaded end of the bolt, with the sockets or recesses 2′ toward the outside. The nut is screwed on the bolt until it is tight and the spring pressed pin engages one of the recesses in the washer.

To take the nut off of the bolt, it is only necessary to pull out the cap member 14 and insert a spike or some other kind of rod or bar, between the outer face of the nut and the inner face of the cap member 14, and then unscrew the bolt. It will be seen that by pulling out the cap member, the same will disengage the head 11 of the pin 9 from the recess 2′ in the washer.

One of the most important features of this invention is the fact that the parts of the lock are made of non-rusting material, and therefore will not become locked by rust forming over the operating parts, as do other nut locks. It will also be noted that the head of the pin and the cap member are so placed that the joints are not exposed to the air and therefore will prevent water and moisture from entering the inner tubing of non-rusting material, thereby keeping the operating mechanism always in perfect condition and ready for instant use.

As various changes in form, proportion, and in the minor details of construction may be resorted to without departing from the spirit of this invention, I do not wish to be limited to the specific construction herein shown and described, other than as claimed.

I claim:—

1. The combination with a threaded bolt, a washer provided with sockets therein, a nut on said bolt, said nut having a longitudinal opening therethrough and a seat cut from one of its faces and communicating with said opening, a tube or casing of non-rusting material, a shoulder on one end of the same, said casing sliding into the opening through the nut, the shoulder on said casing engaging the said seat on the face of the nut, and a spring pressed plunger of non-rusting material in said casing for engagement with one of the sockets in said washer for locking the nut in position.

2. In combination, a nut, said nut having an opening therethrough and parallel to the threaded opening, and a seat cut from its inner face and communicating with said opening, a cylindrical tube or casing of non-rusting material tightly fitting the opening, a laterally extending shoulder on the inner end of said casing to engage said seat, and an annular flange in the outer end of said casing, a pin of non-rusting material, the inner end of said pin fitting tightly in said casing, said pin having its body portion reduced, thereby forming a shoulder and being slidable through said annular flange, and extending out beyond the outer face of the nut, said pin having a transverse opening therethrough at its outer end, a coil spring around the reduced portion of said pin, the inner end of said spring engaging the shoulder on said pin and the outer end of said spring engaging said annular flange, a cap member having a socket in its inner face and a transverse opening therethrough, said cap member engaging the reduced end of said pin so that the openings will register, and a locking pin through said opening, said cap member fitting flush with and entirely covering said casing to render the interior water tight.

In testimony whereof I have hereunto set my hand in the presence of two subscribing witnesses.

JAMES A. HALL.

Witnesses:
 MARINAS K. MARTIN,
 GEORGE L. FITCH.